US010170803B2

(12) United States Patent
Kanada

(10) Patent No.: US 10,170,803 B2
(45) Date of Patent: Jan. 1, 2019

(54) CONTROLLER FOR LITHIUM ION SECONDARY BATTERY THAT SETS AND MODIFIES A LOWER LIMIT STATE OF CHARGE, AND VEHICLE

(71) Applicant: TOYOTA JIDOSHA KABUSHIKI KAISHA, Toyota-shi, Aichi-ken (JP)

(72) Inventor: Ryo Kanada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 94 days.

(21) Appl. No.: 15/183,249

(22) Filed: Jun. 15, 2016

(65) Prior Publication Data

US 2016/0372800 A1 Dec. 22, 2016

(30) Foreign Application Priority Data

Jun. 19, 2015 (JP) ................................ 2015-124179

(51) Int. Cl.
*H02J 7/00* (2006.01)
*H01M 10/42* (2006.01)
(Continued)

(52) U.S. Cl.
CPC ....... *H01M 10/4257* (2013.01); *B60L 3/0046* (2013.01); *B60L 11/1857* (2013.01); *B60L 11/1859* (2013.01); *B60L 11/1862* (2013.01); *H01M 10/44* (2013.01); *H02J 7/0021* (2013.01); *H02J 7/0047* (2013.01); *B60L 2240/545* (2013.01); *H01M 10/0525* (2013.01); *H01M 2220/20* (2013.01);
(Continued)

(58) Field of Classification Search
CPC ......... H01M 10/4257; H01M 10/0525; H01M 2220/20; H02J 2007/005; B60L 11/1857; B60L 11/1859; B60L 11/1862; B60L 2240/545
USPC ........................................................ 320/109
See application file for complete search history.

(56) References Cited

U.S. PATENT DOCUMENTS

2010/0241376 A1 9/2010 Kikuchi et al.
2013/0314050 A1* 11/2013 Matsubara ............... H02J 7/00 320/134

(Continued)

FOREIGN PATENT DOCUMENTS

CN 103298662 A 9/2013
CN 103457003 A 12/2013

(Continued)

*Primary Examiner* — Nathaniel Pelton
(74) *Attorney, Agent, or Firm* — Sughrue Mion, PLLC

(57) ABSTRACT

A controller for a lithium ion secondary battery, includes an electronic control unit configured to: detect an SOC of a lithium ion secondary battery that is a controlled object; set an upper limit SOC and lower limit SOC of a range of use of the lithium ion secondary battery on the basis of the SOC of the lithium ion secondary battery; record a charge history and discharge history of the lithium ion secondary battery; determine whether the lithium ion secondary battery is in an excessive charging state or an excessive discharging state on the basis of the charge history and the discharge history; and raise the lower limit SOC when the lithium ion secondary battery is in the excessive charging state or lower the upper limit SOC when the lithium ion secondary battery is in the excessive discharging state.

18 Claims, 11 Drawing Sheets

(51) Int. Cl.
*H01M 10/44* (2006.01)
*B60L 3/00* (2006.01)
*B60L 11/18* (2006.01)
*H01M 10/0525* (2010.01)

(52) U.S. Cl.
CPC ....... *H02J 2007/005* (2013.01); *Y02E 60/122* (2013.01); *Y02T 10/705* (2013.01); *Y02T 10/7011* (2013.01); *Y02T 10/7044* (2013.01)

(56) References Cited

U.S. PATENT DOCUMENTS

| | | | | |
|---|---|---|---|---|
| 2014/0176085 | A1* | 6/2014 | Maruno | G01R 31/3679 320/162 |
| 2014/0303821 | A1* | 10/2014 | Oda | B60L 1/006 701/22 |
| 2014/0320141 | A1 | 10/2014 | Kaburagi et al. | |
| 2015/0134164 | A1* | 5/2015 | Choi | B60L 11/1861 701/22 |
| 2015/0191098 | A1* | 7/2015 | Chang | B60L 11/1862 701/22 |
| 2015/0306971 | A1* | 10/2015 | Chang | B60L 11/1862 701/22 |
| 2016/0149275 | A1* | 5/2016 | Minamiura | H01M 10/24 320/107 |
| 2016/0172886 | A1* | 6/2016 | Keates | H02J 7/0052 320/130 |
| 2016/0181833 | A1* | 6/2016 | Araki | H01M 10/44 320/134 |
| 2016/0193925 | A1 | 7/2016 | Takada et al. | |
| 2016/0236586 | A1* | 8/2016 | Soo | B60L 11/1862 |

FOREIGN PATENT DOCUMENTS

| | | | |
|---|---|---|---|
| JP | 2009-123435 | A | 6/2009 |
| JP | 2011-189768 | A | 9/2011 |
| JP | 2013-106481 | A | 5/2013 |
| KR | 10-2014-0090216 | A | 7/2014 |
| WO | 2014141532 | A1 | 9/2014 |
| WO | 2015/019834 | A1 | 2/2015 |
| WO | 2015025402 | A1 | 2/2015 |

* cited by examiner

CONTROLLER FOR LITHIUM ION SECONDARY BATTERY THAT SETS AND MODIFIES A LOWER LIMIT STATE OF CHARGE, AND VEHICLE

INCORPORATION BY REFERENCE

The disclosure of Japanese Patent Application No. 2015-124179 filed on Jun. 19, 2015 including the specification, drawings and abstract is incorporated herein by reference in its entirety.

BACKGROUND OF THE INVENTION

1. Field of the Invention

The invention relates to a controller for a lithium ion secondary battery, and a vehicle including the controller for a lithium ion secondary battery.

2. Description of Related Art

In the specification, the word "secondary battery" means repeatedly chargeable battery in general. A lithium ion secondary battery that is an object to be controlled by a controller includes not only a single cell but also a battery pack in which a plurality of battery components are connected. Lithium ion secondary batteries assembled in a battery pack are referred to as battery components as needed.

For example, Japanese Patent Application Publication No. 2011-189768 (JP 2011-189768 A) describes a method of preventing or reducing the degradation of a battery. In this method, a charge current is reduced when the state of charge is high, and a discharge current is reduced when the state of charge is low. For example, it is also suggested that the state of charge and state of degradation of a battery are calculated on the basis of information about voltage, current and temperature and then a limit value of the charge current or a limit value of the discharge current is changed in response to a comparison between estimated degradation estimated in advance by cycle test, or the like, and actual degradation.

Japanese Patent Application Publication No. 2013-106481 (JP 2013-106481 A) describes that a target SOC is set in response to the state of degradation calculated on the basis of an increase or decrease in resistance value and then charge and discharge control is executed.

Japanese Patent Application Publication No. 2009-123435 (JP 2009-123435 A) describes that the amount of degradation is calculated on the basis of a bias of the concentration of ions due to discharging and then a discharge power is restricted.

SUMMARY OF THE INVENTION

Incidentally, for example, when a charge current value of a lithium ion secondary battery is restricted at a low SOC and an output of the lithium ion secondary battery is also restricted, the lithium ion secondary battery is kept in a low SOC state for an extended period of time, and the output of the lithium ion secondary battery is restricted for an extended period of time. When a discharge current value of the lithium ion secondary battery is restricted at a high SOC, the lithium ion secondary battery is kept in a high SOC state for an extended period of time, and the output of the lithium ion secondary battery is restricted for an extended period of time.

A first aspect of the invention is a controller for a lithium ion secondary battery, including an electronic control unit configured to: detect an SOC of a lithium ion secondary battery that is a controlled object; set an upper limit SOC and lower limit SOC of a range of use of the lithium ion secondary battery on the basis of the SOC of the lithium ion secondary battery; record a charge history and discharge history of the lithium ion secondary battery; determine whether the lithium ion secondary battery is in an excessive charging state or an excessive discharging state on the basis of the charge history and the discharge history; and raise the lower limit SOC when the lithium ion secondary battery is in the excessive charging state. The SOC is an abbreviation of state of charge. The SOC is a value that indicates a state of charge with respect to a battery capacity, and is the ratio of the quantity of electricity charged to the battery capacity. According to the first aspect of the invention, the lower limit SOC of the range of use of the lithium ion secondary battery is raised when the lithium ion secondary battery is in the excessive charging state, so it is possible to prevent the lithium ion secondary battery from remaining in the excessive charging state at a low SOC for an extended period of time.

A second aspect of the invention is a controller for a lithium ion secondary battery, comprising an electronic control unit configured to: detect an SOC of a lithium ion secondary battery that is a controlled object; set an upper limit SOC and lower limit SOC of a range of use of the lithium ion secondary battery on the basis of the SOC of the lithium ion secondary battery; record a charge history and discharge history of the lithium ion secondary battery; determine whether the lithium ion secondary battery is in an excessive charging state or an excessive discharging state on the basis of the charge history and the discharge history; and lower the upper limit SOC when the lithium ion secondary battery is in the excessive discharging state. According to the second aspect of the invention, the upper limit SOC of the range of use of the lithium ion secondary battery is lowered when the lithium ion secondary battery is in the excessive discharging state, so it is possible to prevent the lithium ion secondary battery from remaining in the excessive discharging state at a high SOC for an extended period of time.

A third aspect of the invention is a vehicle including: a lithium ion secondary battery that is a controlled object; and the controller of the first aspect of the invention.

A fourth aspect of the invention is a vehicle including: a lithium ion secondary battery that is a controlled object; and the controller of the second aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
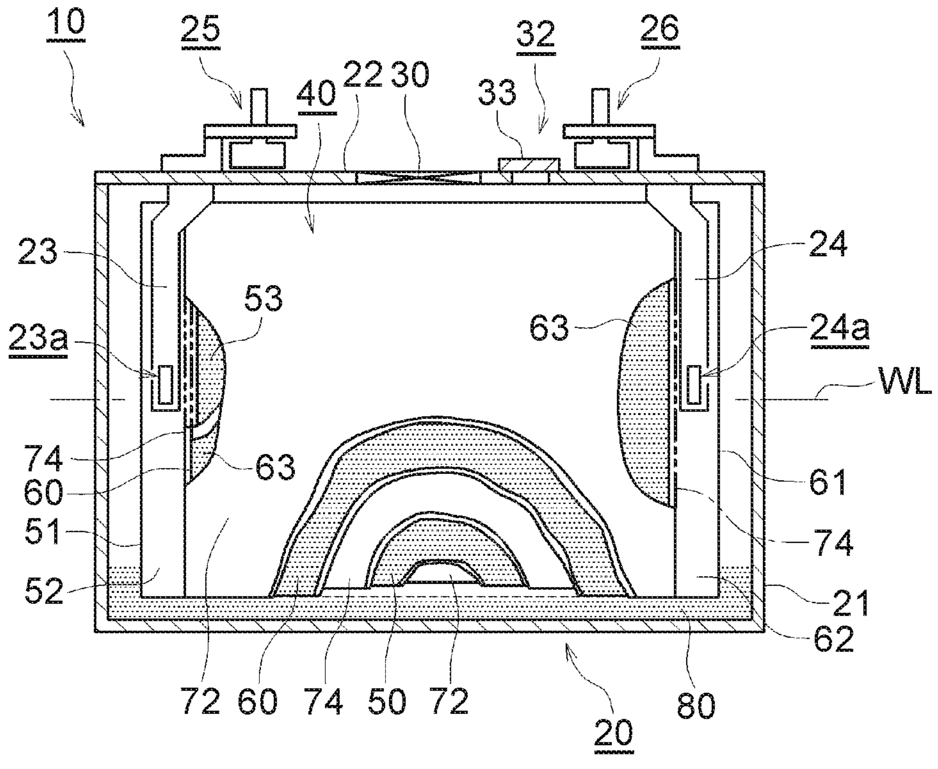
FIG. 1 is a cross-sectional view that shows a typical example of a lithium ion secondary battery that is a controlled object.

Hereinafter, an embodiment of a controller that is suggested in this specification will be described. Of course, the embodiment that will be described in this specification is not intended to limit the invention. Each of the drawings is schematically drawn, and, for example, the scale relation (length, width, thickness, and the like) in each drawing does not reflect an actual scale relation. Like reference numerals denote members and portions that provide the same operations, and the overlap description is omitted or simplified as needed.

In a lithium ion secondary battery, if high-rate charging or high-rate discharging is excessively performed, the battery resistance increases, with the result of an event that the output performance degrades. The inventors proved that, because the amount of current increases in high-rate charging or high-rate discharging, if high-rate charging or high-rate discharging is excessively performed, a distribution of the concentration of lithium ions that contribute to a battery reaction is significantly biased within the battery as compared to a steady state. The inventors hold that such a bias of a distribution of the concentration of lithium ions significantly influences an increase in the battery resistance and the degradation of the output performance. Hereinafter, such an event will be described by using a lithium ion secondary battery 10 as an example, and then a controller according to the embodiment of the invention will be described.

FIG. 1 shows one typical example of the lithium ion secondary battery that is a controlled object. FIG. 1 is a cross-sectional view of the lithium ion secondary battery 10 that is a so-called square battery; The lithium ion secondary battery 10, for example, includes a rolled electrode body 40 in which a positive electrode sheet 50 and a negative electrode sheet 60 are stacked and rolled via a separator 72 or a separator 74. In this lithium ion secondary battery 10, the rolled electrode body 40 and an electrolytic solution 80 are accommodated in a battery case 20. Hereinafter, in the description as to the controller as well, the reference numerals used in FIG. 1 are assigned to components of the lithium ion secondary battery 10 where appropriate.

The positive electrode sheet 50 includes a positive electrode current collector foil 51 and a positive electrode active material layer 53. The positive electrode active material layer 53 is held on each face of the positive electrode current collector foil 51. The positive electrode active material layer 53 includes, for example, positive electrode active material particles, a conductive material and a binder. The positive electrode active material layer 53 is a layer in which the positive electrode active material particles and the conductive material are bound by the binder. The positive electrode active material layer 53 has required air gaps such that the electrolytic solution moderately permeates between the particles.

The negative electrode sheet 60 includes a negative electrode current collector foil 61 and a negative electrode active material layer 63. The negative electrode active material layer 63 is held on each face of the negative electrode current collector foil 61. The negative electrode active material layer 63 includes, for example, negative electrode active material particles, a conductive material and a binder. The negative electrode active material layer 63 is a layer in which the negative electrode active material particles and the conductive material are bound by the binder. The negative electrode active material layer 63 has required air gaps such that the electrolytic solution moderately permeates between the particles.

The positive electrode active material contains lithium, and is a material that releases or stores lithium ions as appropriate in battery reaction. An example of the positive electrode active material includes particles of a lithium composite oxide. The negative electrode active material is a material that can store lithium ions and release stored lithium ions as appropriate in battery reaction. An example of the negative electrode active material includes particles having a graphite structure, such as natural graphite.

In this embodiment, the positive electrode current collector foil 51 is a band-shaped sheet (for example, aluminum foil). The positive electrode active material layer 53 is provided on each face of the positive electrode current collector foil 51 except an exposed portion 52 provided at one side of the positive electrode current collector foil 51 in the width direction. The negative electrode current collector foil 61 is a band-shaped sheet (for example, copper foil). The negative electrode active material layer 63 is provided on each face of the negative electrode current collector foil 61 except an exposed portion 62 provided at one side of the negative electrode current collector foil 61 in the width direction.

The positive electrode sheet 50 and the negative electrode sheet 60 are stacked such that the orientations of the longitudinal directions are aligned with each other and the positive electrode active material layer 53 and the negative electrode active material layer 63 are opposed to each other via the separator 72 or the separator 74. The positive electrode sheet 50 and the negative electrode sheet 60 are stacked such that the exposed portion 52 of the positive electrode current collector foil 51 lies off one side of the separators 72, 74 in the width direction and the exposed portion 62 of the negative electrode current collector foil 61 lies off the other side of the separators 72, 74 in the width direction.

Furthermore, the rolled electrode body 40 is rolled in a state where the positive electrode sheet 50, the negative electrode sheet 60 and the separators 72, 74 are stacked as described above. The rolled electrode body 40 has a flat shape along one plane including a rolling axis WL, and is accommodated in the square battery case 20 having a flat rectangular accommodation space. The exposed portion 52 of the positive electrode current collector foil 51 lies off the separators 72, 74 at one side along the rolling axis WL. The exposed portion 62 of the negative electrode current collector foil 61 lies off the separators 72, 74 at the other side along the rolling axis WL. The exposed portion 52 of the positive electrode current collector foil 51 and the exposed portion 62 of the negative electrode current collector foil 61 each lie off in a spiral shape. As shown in FIG. 1, the exposed portion 52 of the positive electrode current collector foil 51 that lies off the separators 72, 74 is welded to a distal end 23*a* of an internal terminal 23 of a positive electrode. The exposed portion 62 of the negative electrode current collector foil 61 that lies off the separators 72, 74 is welded to a distal end 24*a* of an internal terminal 24 of a negative electrode.

In the example shown in FIG. 1, the battery case 20 includes a case body 21 and a lid plate 22. The case body 21 has a closed-end rectangular parallelepiped shape with one face open. The lid plate 22 is a member that closes the opening of the case body 21. The lid plate 22 is welded to the periphery of the opening of the case body 21. Thus, the substantially hexahedron-shaped battery case 20 is formed. For example, the battery case 20 may be a cylindrical case. The battery case 20 may be a bag-shaped case, and may be a so-called laminate-type external package body. An electrically insulating film (not shown) should be interposed between the battery case 20 and the rolled electrode body 40 accommodated in the battery case 20, with the result that the battery case 20 and the rolled electrode body 40 are electrically insulated from each other.

In the example shown in FIG. 1, an external terminal 25 of the positive electrode and an external terminal 26 of the negative electrode are provided on the lid plate 22. The external terminal 25 of the positive electrode is electrically connected to the internal terminal 23. The positive electrode current collector foil 51 is electrically connected to an external device through the internal terminal 23 and the external terminal 25. The external terminal 26 of the negative electrode is electrically connected to the internal terminal 24. The negative electrode current collector foil 61 is electrically connected to an external device through the internal terminal 24 and the external terminal 26. The lid plate 22 includes a safety valve 30 and a liquid injection hole 32. A cap material 33 is attached to the liquid injection hole 32.

The electrolytic solution 80 accommodated in the battery case 20 enters the inside of the electrode body 40 from both sides in the axial direction of the rolling axis WL. In FIG. 1, the amount of the electrolytic solution 80 is not strict. The electrolytic solution 80 sufficiently permeates the air gaps, and the like, of each of the positive electrode active material layer 53 and the negative electrode active material layer 63 inside the rolled electrode body 40. The electrolytic solution 80 contains lithium ions that serve as electrolytic ions that can contribute to battery reaction in the lithium ion secondary battery 10. An example of the configuration of the lithium ion secondary battery 10 is illustrated above. The detailed description of various materials, such as the active materials, conductive materials and the electrolytic solution 80, that constitute the lithium ion secondary battery 10 is omitted because there are various known literatures.

The lithium ion secondary battery 10 may be used solely as a single cell or may be used as each battery component of a battery pack. That is, a plurality of the lithium ion secondary batteries 10 may be assembled to constitute a battery pack. For example, the lithium ion secondary battery 10 can be installed in a state where the outer face of the battery case 20 is pressed with a required force by applying binding pressure from the outer side in order to prevent or reduce an expansion of the battery case 20. That is, a binding member that presses the outer face of the battery case 20 at the time of installation may be attached to the lithium ion secondary battery 10.

During charging, in the lithium ion secondary battery 10 that is illustrated in this specification, voltage is applied between the positive electrode sheet 50 and the negative electrode sheet 60. When voltage is applied, lithium ions (Li) are released into the electrolytic solution from the positive electrode active material particles in the positive electrode active material layer 53 and electrons are released from the positive electrode active material layer 53 in the positive electrode sheet 50. In the negative electrode sheet 60, electrons are stored. In addition, lithium ions (Li) in the electrolytic solution are absorbed into the negative electrode active material particles in the negative electrode active material layer 63 and stored.

During discharging, in the lithium ion secondary battery 10, electrons are transferred from the negative electrode sheet 60 to the positive electrode sheet 50 due to a potential difference between the negative electrode sheet 60 and the positive electrode sheet 50. In the negative electrode, lithium ions stored in the negative electrode active material particles in the negative electrode active material layer 63 are released into the electrolytic solution. In the positive electrode, lithium ions in the electrolytic solution are captured into the positive electrode active material particles in the positive electrode active material layer 53.

High-rate charging means charging at a current value somewhat larger than the rated capacity of a battery. High-rate discharging means discharging at a current value somewhat larger than the rated capacity of a battery. A reference current value for determining high-rate charging and a reference value for determining high-rate discharging may be the same current value or may be not necessarily the same current value. The reference current value of high-rate charging or high-rate discharging may be set in advance in consideration of, for example, an actual behavior of a secondary battery or resistance against charging or discharging at a high rate. That is, the reference current value of high-rate charging or high-rate discharging is freely determined for an intended secondary battery. The reference current value of high-rate charging or high-rate discharging may be set so as to vary in response to a usage environment, such as temperature. For example, the reference current value may be occasionally corrected by multiplying the reference current value by a coefficient determined in advance in response to a usage environment, such as temperature.

As a typical example, the lithium ion secondary battery 10 shown in FIG. 1 will be described. A degradation event in high-rate charging or high-rate discharging will be described while the reference numerals of the members of the lithium ion secondary battery 10 are assigned. However, a lithium ion secondary battery in which such an event occurs is not limited to the one having a similar structure to the lithium ion secondary battery 10 shown in FIG. 1. For example, the lithium ion secondary battery 10 shown in FIG. 1 includes the rolled electrode body 40. Instead, a lithium ion secondary battery may include a stacked electrode body in which a positive electrode sheet and a negative electrode sheet are alternately stacked via a separator.

In the lithium ion secondary battery 10, if high-rate charging or high-rate discharging is excessively performed, the battery performance may degrade, for example, the battery resistance may increase. According to the findings of the inventors, salt concentration unevenness between the positive electrode active material layer 53 and the negative electrode active material layer 63 and an outflow of the electrolytic solution 80 from the electrode body 40 (particularly, the negative electrode active material layer 63) are linked with such degradation of the battery performance. An expansion of the negative electrode active material particles in the negative electrode active material layer 63 and a thermal expansion of the electrolytic solution 80 in the electrode body 40 are linked with an outflow of the electrolytic solution 80. Hereinafter, these events will be sequentially described.

Figure 2:
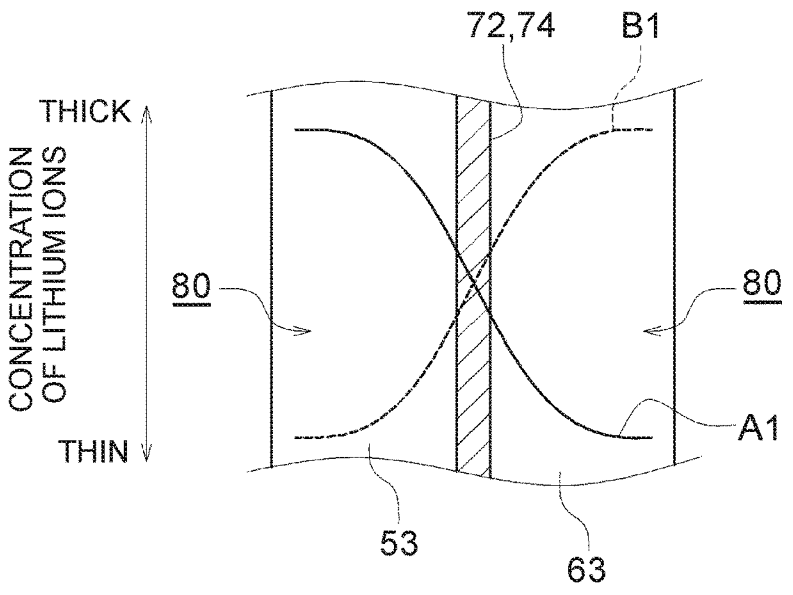
FIG. 2 is a schematic view that shows the cross section of a positive electrode active material layer and negative electrode active material layer opposed to each other via a separator.

FIG. 2 is a schematic view that shows the cross section of the positive electrode active material layer 53 and negative electrode active material layer 63 opposed to each other via the separator 72 or the separator 74. The continuous line A1 indicates a distribution of the concentration of lithium ions during charging in the cross section. The dashed line B1 indicates a distribution of the concentration of lithium ions during discharging in the cross section. In FIG. 2, the continuous line A1 and the dashed line B1 each indicate that the concentration of lithium ions becomes thicker toward the upper side and the concentration of lithium ions becomes thinner toward the lower side.

Salt concentration unevenness between the positive electrode active material layer 53 and the negative electrode active material layer 63 means a difference in the concentration of lithium ions between the electrolytic solution 80 that has permeated the positive electrode active material layer 53 and the electrolytic solution 80 that has permeated the negative electrode active material layer 63. For example, during charging, as indicated by the continuous line A1 in FIG. 2, lithium ions are released into the electrolytic solution 80 that has permeated the positive electrode active material layer 53, and lithium ions are absorbed into the electrolytic solution 80 that has permeated the negative electrode active material layer 63. At this time, the concentration of lithium ions becomes thicker in the electrolytic solution 80 that has permeated the positive electrode active material layer 53. The concentration of lithium ions becomes thinner in the electrolytic solution 80 that has permeated the negative electrode active material layer 63. On the contrary, during discharging, as indicated by the dashed line B1 in FIG. 2, the positive electrode active material layer 53 absorbs lithium ions from the electrolytic solution 80, and the negative electrode active material layer 63 releases lithium ions into the electrolytic solution 80. For this reason, the concentration of lithium ions becomes thinner in the electrolytic solution 80 that has permeated the positive electrode active material layer 53. The concentration of lithium ions becomes thicker in the electrolytic solution 80 that has permeated the negative electrode active material layer 63.

Such salt concentration unevenness is, for example, remarkable in charging or discharging at a current rate higher than the diffusion rate of lithium ions in the electrolytic solution 80. In use for charging or discharging at a low current rate, the degree of salt concentration unevenness is small. When the battery is left standing without being charged or discharged, salt concentration unevenness is gradually eliminated as a result of diffusion of lithium ions in the electrolytic solution.

Figure 3:
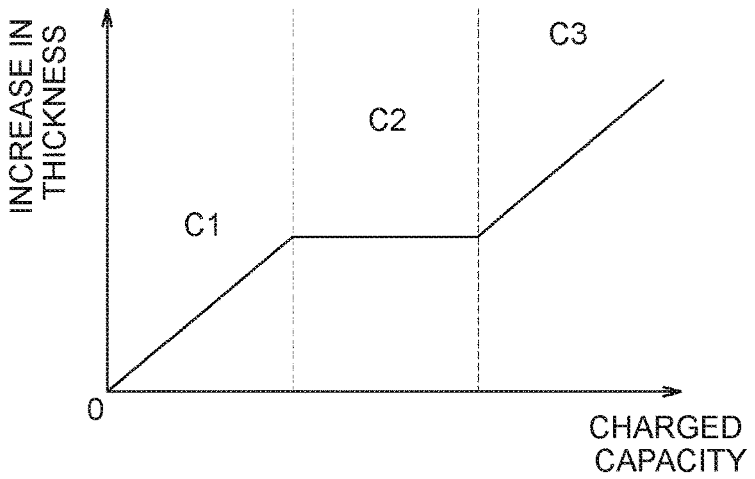
FIG. 3 is a graph that shows a typical relationship between a charged capacity of the lithium ion secondary battery and an increase in the thickness of the negative electrode active material layer.

The negative electrode active material particles of the lithium ion secondary battery 10 tend to expand as charging of the lithium ion secondary battery 10 advances and shrink as the lithium ion secondary battery is discharged. Such a tendency is remarkable, for example, when a material having a graphite structure (graphite-based material), such as natural graphite, graphite and soft carbon, is used as the negative electrode active material particles of the lithium ion secondary battery 10. In the negative electrode active material particles having a graphite structure, when the lithium ion secondary battery 10 is charged, lithium ions are stored between the layers of the graphite structure of the negative electrode active material particles. FIG. 3 is a graph that shows a typical relationship between a charged capacity of the lithium ion secondary battery 10 and an increase in the thickness of the negative electrode active material layer 63.

As the charging of the lithium ion secondary battery 10 advances, the amount of lithium ions that are stored between the layers of the graphite structure in the negative electrode active material particles increases. The distance of an edge face (C-axis direction) of the graphite structure (the interlayer distance of the graphite structure) gradually increases, and the negative electrode active material particles gradually expand. An increase in the thickness of the negative electrode active material layer 63, which is shown in FIG. 3, is due to a gradual expansion of the negative electrode active material particles resulting from a gradual change in the distance of the edge face (C-axis direction) of the graphite structure. As the lithium ion secondary battery 10 is discharged, the negative electrode active material particles gradually shrink.

Particularly, as shown in FIG. 3, in a low SOC range C1 and a high SOC range C3, the negative electrode active material layer 63 becomes thicker as the lithium ion secondary battery 10 is charged. In the specification, the low SOC range C1 is simply referred to as the range C1 where appropriate. The high SOC range C3 is simply referred to as the range C3 where appropriate. Between the range C1 and the range C3, there is an intermediate range C2 in which the thickness of the negative electrode active material layer 63 almost remains unchanged even when the charged capacity increases. The intermediate range C2 is simply referred to as the range C2 where appropriate. The range C2 is a range in which resistance to charging is strong and the negative electrode active material particles almost do not expand or shrink. An SOC at which such a range arises depends on the physical property of the negative electrode active material particles for the charged capacity of the lithium ion secondary battery 10.

The lithium ion secondary battery 10 generates heat in response to battery reaction when the lithium ion secondary battery 10 is charged or discharged. The electrolytic solution 80 expands in response to temperature. As the amount of heat generation of the lithium ion secondary battery 10 increases, the amount of expansion of the electrolytic solution 80 increases. In high-rate charging or high-rate discharging, a tendency resulting from an expansion of the electrolytic solution 80 becomes strong. According to the findings of the inventors, the amount of heat generation Q of a lithium ion secondary battery increases approximately in proportion to $I^2*R$ that is calculated from a current value I and a battery resistance R. That is, as the current value I increases or the battery resistance R increases, the lithium ion secondary battery 10 more easily generates heat in proportion to the square of the current value I during charging or discharging, and the electrolytic solution 80 more easily expands.

According to the findings of the inventors, during high-rate charging, salt concentration unevenness occurs as described above, and the concentration of lithium ions in the electrolytic solution is thin at the negative electrode active material layer 63 side. In addition, the electrolytic solution 80 thermally expands as a result of heat generation of the lithium ion secondary battery 10, and the electrolytic solution 80 flows out from the electrode body 40. In the low SOC range C1 and the high SOC range C3, the negative electrode active material particles expand by a larger amount than in the intermediate range C2, and the electrolytic solution 80 more easily flows out from the electrode body 40. In the intermediate range C2, the negative electrode active material particles almost do not expand, and an outflow of the electrolytic solution 80 is lessened. For this reason, the performance of the lithium ion secondary battery 10 is more difficult to degrade in the intermediate range C2 than in the range C1 and the range C3.

According to the findings of the inventors, during high-rate discharging, salt concentration unevenness occurs as described above, and the concentration of lithium ions in the electrolytic solution is thick at the negative electrode active material layer 63 side. The electrolytic solution 80 thermally expands as a result of heat generation of the lithium ion secondary battery 10, and the electrolytic solution 80 flows out from the electrode body 40. In the low SOC range C1 and the high SOC range C3, the negative electrode active material particles shrink by a larger amount than in the intermediate range C2, and an outflow of the electrolytic solution 80 from the electrode body 40 is lessened. In the intermediate range C2, the negative electrode active material particles almost do not shrink, and an outflow of the electrolytic solution 80 is not lessened. For this reason, the performance of the lithium ion secondary battery 10 is more difficult to degrade in the range C1 and the range C3 than in the intermediate range C2 during high-rate discharging.

Figure 4:
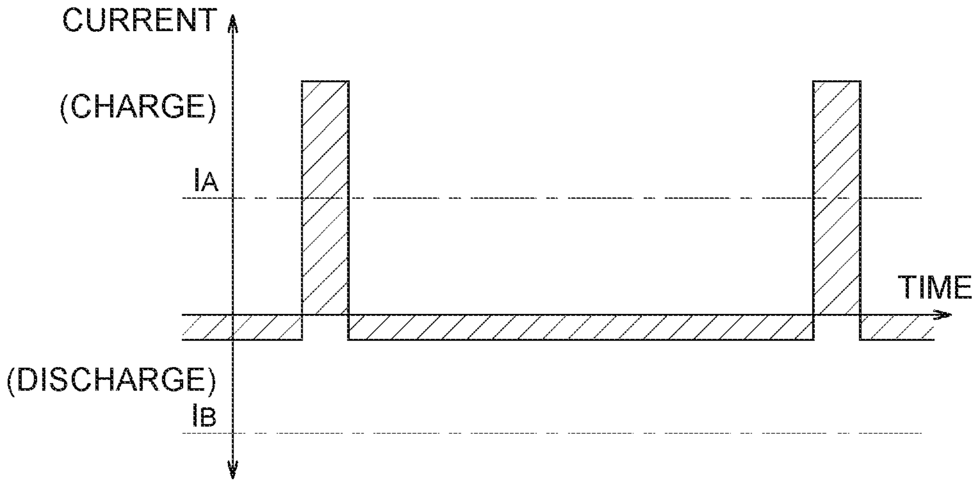
FIG. 4 is a graph that illustrates a typical current pattern in the case where high-rate charging is excessively performed.

FIG. 4 is a graph that illustrates a typical current pattern that is applied to the lithium ion secondary battery 10 in the case where high-rate charging is excessively performed. The ordinate axis represents current value, and the abscissa axis represents time. In this specification, when a discharged capacity discharged at a current value higher than a predetermined discharge current value $I_B$ is smaller than a charged capacity charged at a current value larger than a predetermined charge current value $I_A$ in a predetermined set period, this state is referred to as excessive charging state or excessive high-rate charging state. That is, the state referred to as excessive charging state means a state where high-rate charging is excessively performed in a certain set period. For example, in the example shown in FIG. 4, when the lithium ion secondary battery 10 is charged, the lithium ion secondary battery 10 is charged at a current value larger than the predetermined charge current value $I_A$ in a certain set period. When the lithium ion secondary battery 10 is discharged, the lithium ion secondary battery 10 is discharged at a constant current value smaller than the predetermined discharge current value $I_B$. Such an example is regarded as a typical example of the state referred to as excessive charging state where high-rate charging is performed in excess of high-rate discharging.

Figure 5:
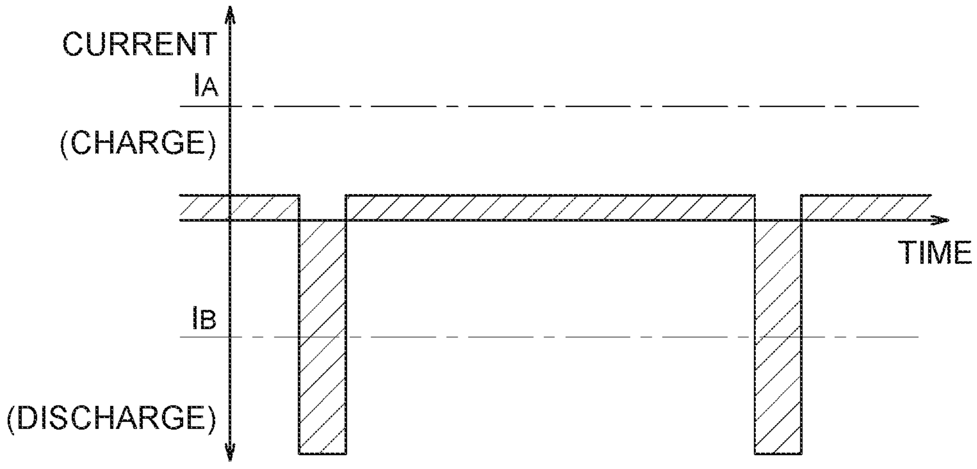
FIG. 5 is a graph that illustrates a typical current pattern in the case where high-rate discharging is excessively performed.

FIG. 5 is a graph that illustrates a typical current pattern that is applied to the lithium ion secondary battery 10 in the case where high-rate discharging is excessively performed. The ordinate axis represents current value, and the abscissa axis represents time. In this specification, when a charged capacity charged at a current value higher than the predetermined charge current value $I_A$ is smaller than a discharged capacity discharged at a current value larger than the predetermined discharge current value $I_B$ in a predetermined set period, this state is referred to as excessive discharging state or excessive high-rate discharging state. That is, the state referred to as excessive discharging state means a state where high-rate discharging is excessively performed in a certain set period. For example, in the example shown in FIG. 5, when the lithium ion secondary battery 10 is discharged, the lithium ion secondary battery 10 is discharged at a current value larger than the predetermined discharge current value $I_B$ in a certain set period. When the lithium ion secondary battery 10 is charged, the lithium ion secondary battery 10 is charged at a constant current value smaller than the predetermined charge current value $I_A$. Such an example is regarded as a typical example of the state referred to as excessive discharging state where high-rate discharging is performed in excess of high-rate charging.

An integrated charged capacity $\Sigma I_A$ charged at a current value larger than the predetermined charge current value $I_A$ is an integrated value of charge current during a time when the lithium ion secondary battery 10 is charged at a current value larger than the predetermined charge current value $I_A$. An integrated discharged capacity $\Sigma I_B$ discharged at a current value larger than the predetermined discharge current value $I_B$ is an integrated value of discharge current during a time when the lithium ion secondary battery 10 is discharged at a current value larger than the predetermined discharge current value $I_B$. In the status of use of the lithium ion secondary battery 10, data, such as temperature, current value during charging, current value during discharging, and voltage, should be recorded in a memory, or the like, and the above-described values should be calculated from the data on the basis of the history of each piece of data.

When the integrated charged capacity $\Sigma I_A$ in high-rate charging is larger than the integrated discharged capacity $\Sigma I_B$ in high-rate discharging in a predetermined set period, this state is referred to as excessive charging state. When the integrated discharged capacity $\Sigma I_B$ in high-rate discharging is larger than the integrated charged capacity $\Sigma I_A$ in high-rate charging in a predetermined set period, this state is referred to as excessive discharging state. When the difference between the integrated charged capacity $\Sigma I_A$ in high-rate charging and the integrated discharged capacity $\Sigma I_B$ in high-rate discharging is smaller than a predetermined capacity in a predetermined set period, this state may be referred to as, so to speak, a neutral state that is not included in the excessive charging state or the excessive discharging state.

Figure 6:
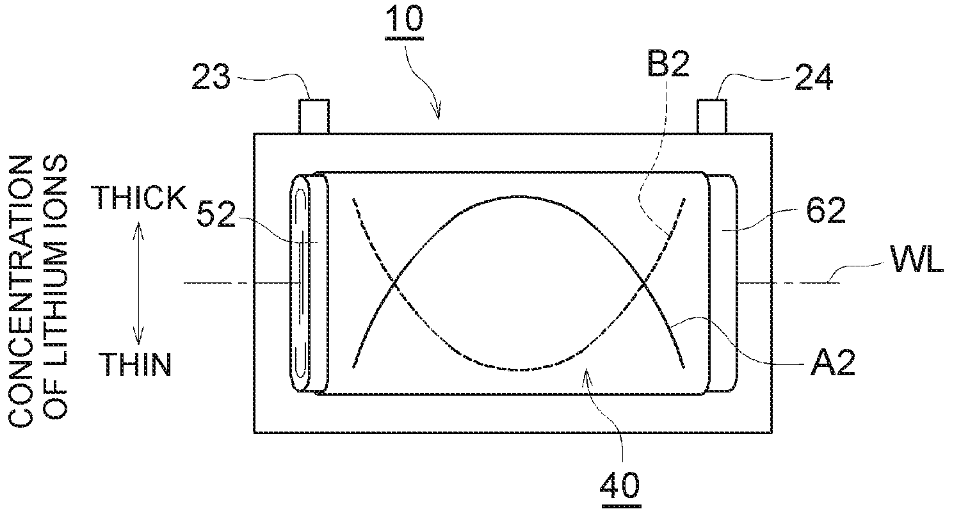
FIG. 6 is a schematic view that shows a distribution of the concentration of lithium ions that have permeated a rolled electrode body of the lithium ion secondary battery.

FIG. 6 is a schematic view that shows a distribution of the concentration of lithium ions in the electrolytic solution 80 that has permeated the rolled electrode body 40 of the lithium ion secondary battery 10. The continuous line A2 in FIG. 6 indicates a distribution of the concentration of lithium ions in the case of an excessive charging state. The dashed line B2 indicates a distribution of the concentration of lithium ions in the case of an excessive discharging state. Each of the continuous line A2 and the dashed line B2 indicates the tendency of a distribution of the concentration of lithium ions along the rolling axis WL. In FIG. 6, the continuous line A2 and the dashed line B2 each indicate that the concentration of lithium ions becomes thicker toward the upper side and the concentration of lithium ions becomes thinner toward the lower side. In each of the continuous line A2 and the dashed line B2, the concentration of lithium ions is relatively evaluated along the rolling axis WL.

In an excessive charging state where high-rate charging has been excessively performed, the concentration of lithium ions in the electrolytic solution 80 that has permeated the negative electrode active material layer 63 is thin, as indicated by the continuous line A1 in FIG. 2. Then, the electrolytic solution 80 of which the concentration of lithium ions is thin flows out from the rolled electrode body 40. For this reason, on average, the concentration of lithium ions tends to be thick in the electrolytic solution 80 that has permeated the rolled electrode body 40. In addition, under the influence of an expansion of the negative electrode active material particles, the electrolytic solution easily flows out from both ends of the rolled electrode body 40 along the rolling axis WL. For this reason, in an excessive charging state, as indicated by the continuous line A2 in FIG. 6, the concentration of lithium ions tends to be thick at the center of the rolled electrode body 40 and tends to be thin at both ends of the rolled electrode body 40 along the rolling axis WL.

In an excessive discharging state where high-rate discharging has been excessively performed, the concentration of lithium ions in the electrolytic solution 80 that has permeated the negative electrode active material layer 63 is thick, as indicated by the dashed line B1 in FIG. 2. Then, the electrolytic solution 80 of which the concentration of lithium ions is thick flows out from the rolled electrode body 40. For this reason, on average, the concentration of lithium ions tends to be thin in the electrolytic solution 80 that has permeated the rolled electrode body 40. In addition, under the influence of a shrinkage of the negative electrode active material particles, an outflow of the electrolytic solution is lessened at both ends of the rolled electrode body 40 along the rolling axis WL. For this reason, in an excessive discharging state, as indicated by the dashed line B2 in FIG. 6, the concentration of lithium ions tends to be thin at the center of the rolled electrode body 40 and tends to be thick at both ends of the rolled electrode body 40 along the rolling axis WL.

In an excessive charging state, as indicated by the continuous line A1 in FIG. 2, the concentration of lithium ions in the electrolytic solution 80 is thick at the positive electrode active material layer 53 side, and the concentration of lithium ions in the electrolytic solution 80 is thin at the negative electrode active material layer 63 side. The electrolytic solution 80 thermally expands as a result of heat generation of the lithium ion secondary battery 10, and the electrolytic solution 80 flows out from the electrode body 40. In addition, as indicated by the continuous line A2 in FIG. 6, the concentration of lithium ions at both ends of the rolled electrode body 40 along the rolling axis WL tends to be thinner than the concentration of lithium ions at the center of the rolled electrode body 40 along the rolling axis WL. In an excessive charging state, a difference in the concentration of lithium ions in the electrolytic solution 80 that has permeated the electrode body 40 increases. As the difference in the concentration of lithium ions increases, the difference becomes one of factors responsible for an increase in the battery resistance of the lithium ion secondary battery 10.

In order to early eliminate the difference in the concentration of lithium ions in the excessive charging state, charging of the lithium ion secondary battery 10 should be restricted, and the lithium ion secondary battery 10 should be discharged at a somewhat large current value. However, the current rate during discharging may be restricted depending on an application. For example, in an application to a vehicle, such as a hybrid vehicle, the lithium ion secondary battery 10 is used as a power supply for operating a motor that transmits power to a drive wheel. In an application to a vehicle, a current rate that is required during discharging in the case of a sudden start, or the like, is larger than that in another application. In such an application, the lithium ion secondary battery 10 may be controlled such that a discharge current is kept at a small value at a low SOC near the lower limit of the range of use.

In such an application, if the lithium ion secondary battery 10 falls in an excessive charging state at a low SOC and then the charge current value is restricted in order to eliminate the excessive charging state, the lithium ion secondary battery 10 can remain in a low SOC state for an extended period of time. If the lithium ion secondary battery 10 remains in a low SOC state for an extended period of time and the discharge current is kept at a small value, the lithium ion secondary battery 10 comes not to sufficiently work. If the lithium ion secondary battery 10 falls in such a state, the output of the battery is restricted for an extended period of time in the hybrid vehicle, and the hybrid vehicle is frequently propelled by an engine. As a result, the fuel consumption deteriorates.

In an excessive discharging state, as indicated by the dashed line B1 in FIG. 2, the concentration of lithium ions in the electrolytic solution 80 is thin at the positive electrode active material layer 53 side, and the concentration of lithium ions in the electrolytic solution 80 is thick at the negative electrode active material layer 63 side. The electrolytic solution 80 thermally expands as a result of heat generation of the lithium ion secondary battery 10, and the electrolytic solution 80 flows out from the electrode body 40. In addition, as indicated by the dashed line B2 in FIG. 6, the concentration of lithium ions at both ends of the rolled electrode body 40 along the rolling axis WL tends to be thicker than the concentration of lithium ions at the center of the rolled electrode body 40 along the rolling axis WL. In an excessive discharging state, a difference in the concentration of lithium ions in the electrolytic solution 80 that has permeated the electrode body 40 increases. As the difference in the concentration of lithium ions increases, the difference becomes one of factors responsible for an increase in the battery resistance of the lithium ion secondary battery 10.

In order to early eliminate the difference in the concentration of lithium ions in the excessive discharging state, discharging of the lithium ion secondary battery 10 should be restricted, and the lithium ion secondary battery 10 should be charged at a somewhat large current value. However, the current rate during charging may be restricted depending on an application. For example, the above-described lithium ion secondary battery 10 in an application to a vehicle, such as an electric vehicle and a hybrid vehicle, may be controlled such that the charge current value is kept at a small value at a high SOC near the upper limit of the range of use.

In the case where the lithium ion secondary battery 10 is controlled such that the charge current value is kept at a small value at a high SOC, when the lithium ion secondary battery 10 falls in an excessive discharging state at a high SOC, control for restricting the discharge current value is added in order to eliminate the excessive discharging state. In such a situation, discharging of the lithium ion secondary battery 10 is restricted at a high SOC, so the lithium ion secondary battery 10 may remain in a high SOC state for an extended period of time. If the lithium ion secondary battery 10 remains in an excessive discharging state at a high SOC for an extended period of time and the discharge current is kept at a small value, the lithium ion secondary battery 10 comes not to sufficiently work. If the lithium ion secondary battery 10 falls in such a state, the output of the battery is restricted for an extended period of time in the hybrid vehicle, and the hybrid vehicle is frequently propelled by an engine. As a result, the fuel consumption deteriorates.

Figure 7:
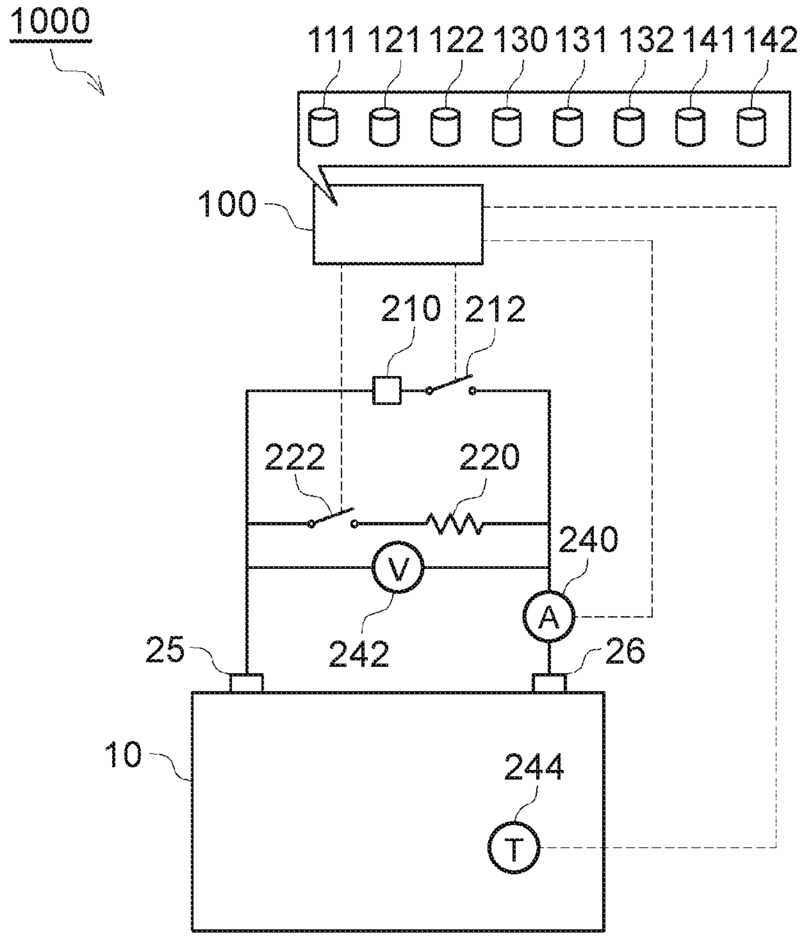
FIG. 7 is a block diagram that schematically shows a control system.

Next, the controller that is suggested in this specification will be described. FIG. 7 is a block diagram that schematically shows a control system 1000 including the lithium ion secondary battery 10, which is a controlled object, and the controller 100. The controller 100 includes a processing device and a recording device. The controller 100 executes predetermined arithmetic processing in accordance with preset programs, and controls the lithium ion secondary battery 10 that is the controlled object. The controller 100 implements processes by executing the preset programs.

In this embodiment, the controller 100 includes a first recording unit 111, a first processing unit 121, a second processing unit 122, an SOC detection unit 130, a range-of-use setting unit 131 and a degradation amount detection unit 132. The lithium ion secondary battery 10, which is the controlled object, is connected to an input-side device 210 and an output-side device 220 via a circuit. The circuit includes a switch 212 and a switch 222. The switch 212 switches connection to the input-side device 210. The switch 222 switches connection to the output-side device 220. Each of the switches 212, 222 is operated under control of the controller 100. The control system 1000 includes an ammeter 240, a voltmeter 242 and a thermometer 244. The ammeter 240 measures the current values of input to and output from (charge and discharge current values of) the lithium ion secondary battery 10 in the above-described circuit. The voltmeter 242 measures the voltage between the positive and negative electrodes of the secondary battery in the above-described circuit. The thermometer 244 measures the temperature of an environment in which the lithium ion secondary battery 10 is installed.

The SOC detection unit 130 is a processing unit that detects the SOC. Various techniques are known as a technique for detecting the SOC, and any technique may be employed as needed. For example, there is a method in which a predetermined battery capacity is recorded, and the SOC is estimated by acquiring an integrated charged capacity and an integrated discharged capacity on the basis of a charge history and a discharge history from an initial state. There is also a method in which the SOC is estimated on the basis of an open circuit voltage (OCV) of the lithium ion secondary battery 10. In the process of detecting the SOC, some errors can occur or the battery capacity of the lithium ion secondary battery can change, so the detected SOC may be reset in a predetermined set period of use.

The range-of-use setting unit 131 is a processing unit that sets the range of use of the lithium ion secondary battery 10. There are some methods as a method of setting the range of use by the use of the range-of-use setting unit 131.

For example, the range-of-use setting unit 131 may set the range of use of the lithium ion secondary battery 10 on the basis of the SOC detected by the SOC detection unit 130. The upper limit of the range of use of the lithium ion secondary battery 10 is referred to as upper limit SOC, and the lower limit of the range of use is referred to as lower limit SOC. As another method, the range-of-use setting unit 131 may set the center range of the range of use of the lithium ion secondary battery 10 on the basis of the SOC detected by the SOC detection unit 130. In this case, the center range may be set with a certain width. For example, the lithium ion secondary battery 10 may be controlled while the center range is set to a range of SOC 35% to SOC 65%. The center range may be, for example, set as a center value. Any appropriate value should be set for the center value. Any appropriate range should be set for a predetermined set range from the center value.

The controller 100 should control charging and discharging of the lithium ion secondary battery 10 such that the lithium ion secondary battery 10 is used within the range of use set by the range-of-use setting unit 131. For example, the controller 100 should restrict a charge current as needed at the upper limit of the range of use such that the SOC does not exceed the upper limit SOC. The controller 100 should restrict a discharge current as needed at the lower limit of the range of use such that the SOC does not exceed the lower limit SOC.

The charge history and discharge history of the lithium ion secondary battery 10, which is the controlled object, are recorded in the first recording unit 111. In this embodiment, current values that are obtained from the ammeter 240 are recorded as the charge history and discharge history of the lithium ion secondary battery 10. In this embodiment, while the current values that are obtained from the ammeter 240 are recorded, measured values measured by the voltmeter 242 and the thermometer 244 are recorded at the time when the current values are recorded.

Whether the lithium ion secondary battery 10 is in the excessive charging state or the excessive discharging state is evaluated on the basis of the difference between the integrated charged capacity $\Sigma I_A$ in high-rate charging and the integrated discharged capacity $\Sigma I_B$ in high-rate discharging in a predetermined set period as described above. The controller 100 should, for example, evaluate the state of the lithium ion secondary battery 10 as the excessive charging state when $(\Sigma I_A - \Sigma I_B)$ is positive or the excessive discharging state when $(\Sigma I_A - \Sigma I_B)$ is negative on the basis of the charge history and discharge history of the lithium ion secondary battery 10 that is the controlled object. The charge history and discharge history of the lithium ion secondary battery 10 are recorded in the first recording unit 111. When the difference falls within a set electric capacity, the state of the lithium ion secondary battery 10 may be determined as the neutral state that is neither the excessive charging state nor the excessive discharging state. In this case, for example, when the difference falls within about 20% of a battery capacity C0, the state of the lithium ion secondary battery 10 may be determined as the neutral state that is neither the excessive charging state nor the excessive discharging state.

When the lithium ion secondary battery 10 is in the excessive charging state on the basis of the charge history and discharge history recorded in the first recording unit 111, the first processing unit 121 raises the lower limit SOC of the range of use of the lithium ion secondary battery 10, set by the range-of-use setting unit 131. Thus, when the lithium ion secondary battery 10 is in the excessive charging state, it is possible to prevent the lithium ion secondary battery 10 from remaining in the low SOC state for an extended period of time. There are some methods as such a process. The following some methods may be combined with each other as needed as long as there is no interference.

For example, it is assumed that the range-of-use setting unit 131 sets a range of SOC 30% to SOC 70% as the range of use of the lithium ion secondary battery 10 on the basis of the SOC detected by the SOC detection unit 130. In this case, when the lithium ion secondary battery 10 is in the excessive charging state on the basis of the charge history and discharge history recorded in the first recording unit 111, the first processing unit 121 should set the lower limit SOC of the range of use of the lithium ion secondary battery 10, set by the range-of-use setting unit 131, to 40%. Thus, even when the lithium ion secondary battery 10 remains at about SOC 30%, the SOC of the lithium ion secondary battery 10 increases to about SOC 40% as a result of a restriction on discharge current and charging of the lithium ion secondary battery 10. Thus, when the lithium ion secondary battery 10 is in the excessive charging state, the lithium ion secondary battery 10 is allowed to exit from the low SOC state.

The lower limit SOC of the range of use of the lithium ion secondary battery 10, for example, depends on the physical property of the negative electrode active material particles, and should be set on the basis of the lower limit value of the above-described intermediate range C2 (see FIG. 3). The lower limit SOC of the range of use of the lithium ion secondary battery 10 may be, for example, set to a value slightly higher than the lower limit value of the above-described intermediate range C2. Thus, the range of use of the lithium ion secondary battery 10 is set to a range in which the negative electrode active material particles do not expand or shrink, on the basis of the physical property of the negative electrode active material particles.

The controller 100 may include a discharge restricting unit 141. When the lithium ion secondary battery 10 is in the excessive charging state on the basis of the charge history and discharge history recorded in the first recording unit 111, the discharge restricting unit 141 restricts a discharge current such that the discharge current is smaller than a predetermined current value. That is, with the discharge restricting unit 141, the discharge current is kept at a small value. For this reason, the SOC of the lithium ion secondary battery 10 is difficult to decrease, and increases each time the lithium ion secondary battery 10 is charged. The discharge restricting unit 141 may completely restrict discharging of the lithium ion secondary battery 10. That is, the discharge restricting unit 141 may restrict discharging such that the lithium ion secondary battery 10 is not discharged at all. In this case, when the lithium ion secondary battery 10 is in the excessive charging state, discharging of the lithium ion secondary battery 10 is completely restricted, and the lithium ion secondary battery 10 is charged only, so the SOC increases earlier.

As another method, the first processing unit 121 may include an SOC increasing process for charging the lithium ion secondary battery 10 at a current value smaller than a predetermined current value when the SOC of the lithium ion secondary battery 10 is lower than a predetermined SOC. This process is able to increase the SOC of the lithium ion secondary battery 10 while preventing or reducing an advance of the excessive charging state by charging the lithium ion secondary battery 10 at a low charging rate. Thus, the SOC of the lithium ion secondary battery 10 is forcibly increased, so it is possible to early cause the lithium ion secondary battery 10 to exit from a low SOC state. The current value that is set here should be, for example, smaller than or equal to 1 C, more desirably smaller than or equal to 0.5 C, and further desirably smaller than or equal to 0.3 C.

The first processing unit 121 may further lower the upper limit SOC of the range of use of the lithium ion secondary battery 10, set by the range-of-use setting unit 131. The upper limit SOC should be lower than or equal to a predetermined value. The upper limit SOC is set so as to be higher than the lower limit SOC that has been raised.

The range-of-use setting unit 131, for example, sets a range of SOC 30% to SOC 70% as the range of use of the lithium ion secondary battery 10 on the basis of the SOC detected by the SOC detection unit 130. In this case, the first processing unit 121 may lower the upper limit SOC of the range of use of the lithium ion secondary battery 10, set by the range-of-use setting unit 131, to, for example, 60%. The upper limit SOC should be, for example, set on the basis of the upper limit value of the above-described intermediate range C2. In this case, the upper limit SOC of the range of use of the lithium ion secondary battery 10 should be set to a value slightly lower than the upper limit value of the above-described intermediate range C2. Thus, the range of use of the lithium ion secondary battery 10 is set to a range in which the negative electrode active material particles do not expand or shrink, on the basis of the physical property of the negative electrode active material particles. Such inconvenience that a difference in the concentration of lithium ions is increased is early eliminated.

As another mode, the range-of-use setting unit 131 may include the process of setting the center range of the range of use of the lithium ion secondary battery 10 on the basis of the SOC detected by the SOC detection unit 130. In this case, the first processing unit 121 that raises the lower limit SOC of the range of use of the lithium ion secondary battery 10 should, for example, raise the center range of the range of use of the lithium ion secondary battery 10, set by the range-of-use setting unit 131. Thus, under control of the controller 100, a target value of the SOC increases, and the lithium ion secondary battery 10 is controlled such that the SOC of the lithium ion secondary battery 10 increases.

For example, it is assumed that the range-of-use setting unit 131 sets the center value to SOC 50% and sets a range of −20% to +20% from the center value as the range of use. In this case, the first processing unit 121 should set the center value of the range of use to SOC 60%. Thus, a range of SOC 40% to SOC 80% is set as the range of use, and a discharge current is restricted in the case where the lithium ion secondary battery 10 remains at about SOC 30%. Because the discharge current is restricted, the SOC of the lithium ion secondary battery 10 is early increased to about SOC 40% as a result of charging of the lithium ion secondary battery 10. When the range-of-use setting unit 131 sets the center value to SOC 50% and sets a range of −20% to +20% from the center value as the range of use, the first processing unit 121 may set a range of −10% to +10% from the center value as the range of use. In this case as well, the controller 100 is able to raise the lower limit SOC of the lithium ion secondary battery 10 and lower the upper limit SOC, so the controller 100 is able to cause the lithium ion secondary battery 10 to exit from a low SOC state.

As described above, with the process that is executed by the first processing unit 121, it is possible to prevent the lithium ion secondary battery 10 from remaining in a low SOC state. In this case, discharging of the lithium ion secondary battery 10 may be restricted in order to early increase the SOC of the lithium ion secondary battery 10 remaining in a low state. When the SOC of the lithium ion secondary battery 10 becomes higher than a predetermined SOC, a restriction on discharging may be stopped or relaxed. This is because, when the SOC of the lithium ion secondary battery 10 becomes higher than the predetermined SOC, it is not necessary to restrict discharging by a large amount any more. The predetermined SOC should be predetermined as a first reference S1 for reconsidering a restriction on discharging.

Next, when the lithium ion secondary battery 10 is in the excessive discharging state, the second processing unit 122 lowers the upper limit SOC of the range of use of the lithium ion secondary battery 10, set by the range-of-use setting unit 131, on the basis of the charge history and discharge history recorded in the first recording unit 111. Thus, when the lithium ion secondary battery 10 is in the excessive discharging state, it is possible to prevent the lithium ion secondary battery 10 from remaining in the high SOC state for an extended period of time. There are some methods as such a process. The following some methods may be combined with each other as needed as long as there is no interference.

For example, it is assumed that the range-of-use setting unit 131 sets a range of SOC 30% to SOC 70% as the range of use of the lithium ion secondary battery 10. In this case, the second processing unit 122 should lower the upper limit SOC of the range of use, and should, for example, set the upper limit SOC to 60%. Thus, even when the SOC of the lithium ion secondary battery 10 remains at about SOC 70%, a charge current is restricted, and the lithium ion secondary battery 10 is discharged, so the SOC of the lithium ion secondary battery 10 decreases to about SOC 60%.

For example, the controller 100 may include a charge restricting unit 142. When the lithium ion secondary battery 10 is in the excessive discharging state on the basis of the charge history and discharge history recorded in the first recording unit 111, the charge restricting unit 142 restricts a charge current such that the charge current is smaller than a predetermined current value. That is, with the charge restricting unit 142, the charge current is kept at a small value. For this reason, the SOC of the lithium ion secondary battery 10 is difficult to increase, and decreases each time the lithium ion secondary battery 10 is discharged. The charge restricting unit 142 may completely restrict charging of the lithium ion secondary battery 10. That is, the charge restricting unit 142 may restrict charging such that the lithium ion secondary battery 10 is not charged at all. In this case, when the lithium ion secondary battery 10 is in the excessive discharging state, charging of the lithium ion secondary battery 10 is completely restricted, and the lithium ion secondary battery 10 is discharged only, so the SOC decreases earlier.

As another method, the second processing unit 122 may include an SOC decreasing process for discharging the lithium ion secondary battery 10 at a current value smaller than a predetermined current value when the SOC of the lithium ion secondary battery 10 is higher than a predetermined SOC. This process is able to decrease the SOC of the lithium ion secondary battery 10 while preventing or reducing an advance of the excessive discharging state by discharging the lithium ion secondary battery 10 at a low discharging rate. Thus, the SOC of the lithium ion secondary battery 10 is forcibly decreased, so it is possible to early cause the lithium ion secondary battery 10 to exit from a high SOC state. The current value that is set here should be, for example, smaller than or equal to 1 C, more desirably smaller than or equal to 0.5 C, and further desirably smaller than or equal to 0.3 C.

The second processing unit 122 may raise the lower limit SOC of the range of use of the lithium ion secondary battery 10, set by the range-of-use setting unit 131. The lower limit SOC is set so as to be lower than the higher limit SOC that has been lowered. It is possible to control the lithium ion secondary battery 10 to the intermediate range C2 by determining the upper limit SOC and the lower limit SOC in response to the upper limit and lower limit of the intermediate range C2 of the lithium ion secondary battery 10 that is the controlled object. By controlling the lithium ion secondary battery 10 to the intermediate range C2, an expansion of the negative electrode active material particles does not occur during charging, so the degradation of the lithium ion secondary battery 10 is early recovered.

As another mode, the range-of-use setting unit 131 may include the process of setting the center range of the range of use of the lithium ion secondary battery 10 on the basis of the SOC detected by the SOC detection unit 130. In this case, the second processing unit 122 that lowers the upper limit SOC of the range of use of the lithium ion secondary battery 10 should lower the center range of the range of use of the lithium ion secondary battery 10, set by the range-of-use setting unit 131. Thus, under control of the controller 100, a target value of the SOC increases, and the lithium ion secondary battery 10 is controlled such that the SOC of the lithium ion secondary battery 10 decreases.

For example, it is assumed that the range-of-use setting unit 131 sets the center value of the range of use to SOC 50% and sets a range of −20% to +20% from the center value as the range of use. In this case, the second processing unit 122 should set the center value of the range of use to SOC 40%. Thus, even when a range of SOC 20% to SOC 60% is set as the range of use and the SOC of the lithium ion secondary battery 10 remains at about SOC 70%, a charge current is restricted, and the SOC of the lithium ion secondary battery 10 decreases to about SOC 60%. When the range-of-use setting unit 131 sets the center value to SOC 50% and sets a range of −20% to +20% from the center value as the range of use, the second processing unit 122 may set a range of −10% to +10% from the center value as the range of use. In this case, the controller 100 is able to lower the upper limit SOC of the lithium ion secondary battery 10 and raise the lower limit SOC.

As described above, with the process that is executed by the second processing unit 122, it is possible to prevent the lithium ion secondary battery 10 from remaining in a high SOC state. In this case, charging of the lithium ion secondary battery 10 may be restricted in order to early decrease the SOC of the lithium ion secondary battery 10 remaining in a high state. When the SOC of the lithium ion secondary battery 10 becomes lower than a predetermined SOC, a restriction on charging may be stopped or relaxed. This is because, when the SOC of the lithium ion secondary battery 10 becomes lower than the predetermined SOC, it is not necessary to restrict charging by a large amount any more. The predetermined SOC should be predetermined as a second reference S2 for reconsidering a restriction on charging.

As described above, when the lithium ion secondary battery 10 is in an excessive charging state, the first processing unit 121 raises the lower limit SOC of the range of use of the lithium ion secondary battery 10. Thus, when the lithium ion secondary battery 10 is in the excessive charging state, it is possible to prevent the lithium ion secondary battery 10 from remaining in the low SOC state for an extended period of time. When the lithium ion secondary battery 10 is in an excessive discharging state, the second processing unit 122 lowers the upper limit SOC of the range of use of the lithium ion secondary battery 10. Thus, when the lithium ion secondary battery 10 is in the excessive discharging state, it is possible to prevent the lithium ion secondary battery 10 from remaining in the high SOC state for an extended period of time. Such control is particularly effective at early eliminating the degradation of the performance of the lithium ion secondary battery 10 due to a significant bias of a distribution of the concentration of lithium ions in the electrolytic solution 80 that has permeated the electrode body 40. Even in an application that high-rate charging and high-rate discharging are repeated, particularly, when there is no degradation of the performance, such as an increase in battery resistance, due to this application, there can be a case where it is not required to cause the first processing unit 121 or the second processing unit 122 to execute the process. Therefore, as a precondition for determining whether to cause the first processing unit 121 to execute the process or whether to cause the second processing unit 122 to execute the process (in this embodiment, as a precondition of a determination process for determining whether the lithium ion secondary battery 10 is in the above-described excessive charging state or whether the lithium ion secondary battery 10 is in the excessive discharging state), a determination process for determining whether there is the degradation of the performance may be executed.

In this embodiment, the controller 100 includes the degradation amount detection unit 132. The degradation amount detection unit 132 detects a high-rate degradation amount dHR of the lithium ion secondary battery 10. The controller 100 may be configured to cause the first processing unit 121 or the second processing unit 122 to execute the process when the high-rate degradation amount dHR detected by the degradation amount detection unit 132 is higher than a predetermined first reference value R1.

The controller 100 may also be configured to cause the first processing unit 121 or the second processing unit 122 to stop the process when the high-rate degradation amount dHR detected by the degradation amount detection unit 132 is lower than a predetermined second reference value R2 in the case where the first processing unit 121 or the second processing unit 122 is executing the process.

The high-rate degradation amount dHR that is detected by the degradation amount detection unit 132 may be calculated on the basis of a resistance increase rate dR of the lithium ion secondary battery 10. The resistance increase rate dR is calculated as the ratio (Rc/Rini) of a current resistance value Rc of the lithium ion secondary battery 10 to an initial resistance value Rini of the lithium ion secondary battery 10. The initial state should be, for example, a state where a predetermined conditioning process is passed after the lithium ion secondary battery 10 has been manufactured. In this case, a calculated resistance increase rate dR may be set as the high-rate degradation amount dHR (that is, dHR=dR). In this case, when the resistance increase rate dR has increased, it is allowed to be handled that the high-rate degradation amount dHR has increased.

In this case, the first reference value R1 is a threshold for determining whether to cause the first processing unit 121 or the second processing unit 122 to execute the process. Therefore, when a calculated resistance increase rate dR is set as the high-rate degradation amount dHR, a threshold should be set on the resistance increase rate dR. For example, if the first reference value R1 is set to 115%, the first processing unit 121 or the second processing unit 122 is caused to execute the process when the resistance has increased by 15% or more. The first reference value R1 is also referred to as an activation degradation amount as a threshold for causing the first processing unit 121 or the second processing unit 122 to execute the process.

The second reference value R2 is a threshold for determining whether to cause the first processing unit 121 or the second processing unit 122 to stop the process. Therefore, when a calculated resistance increase rate dR is set as the high-rate degradation amount dHR, a threshold should be set on the resistance increase rate dR. For example, if the second reference value R2 is set to 105%, the first processing unit 121 or the second processing unit 122 is caused to stop the process when the resistance increase rate becomes lower than 5%. Thus, it is possible to prevent the first processing unit 121 or the second processing unit 122 from executing the process more than necessary. The second reference value R2 is also referred to as stop degradation amount as a threshold for causing the first processing unit 121 or the second processing unit 122 to stop the process. The second reference value R2 as the stop degradation amount may include a second reference value R2A at the time of causing the first processing unit 121 to stop the process and a second reference value R2B at the time of causing the second processing unit 122 to stop the process, and the second reference value R2A and the second reference value R2B may be different from each other. That is, by varying the second reference value R2A at the time of causing the first processing unit 121 to stop the process and the second reference value R2B at the time of causing the second processing unit 122 to stop the process from each other, it is possible to individually cause the first processing unit 121 or the second processing unit 122 to stop the process at appropriate timing.

Because one of factors responsible for the above-described degradation (increase in resistance) due to high-rate charging and high-rate discharging is a significant bias of the concentration of lithium ions, the degradation is reduced when the lithium ion secondary battery 10 is left standing for an extended period of time. Factors responsible for an increase in the resistance of the lithium ion secondary battery 10 is not limited to a significant bias of the concentration of lithium ions. For example, the factors also include temperature, aged degradation resulting from specifications, and the like. For this reason, the high-rate degradation amount dHR may be calculated by correcting a calculated resistance increase rate dR as needed on the basis of a temperature and a use history, such as a charge history and a discharge history. In this case, where a correction coefficient is Kc, the high-rate degradation amount dHR is expressed by dHR=dR*Kc. Here, * indicates multiplication. Kc is a coefficient that is adjusted on the basis of a temperature and a use history, such as a charge history and a discharge history. In this way, the high-rate degradation amount dHR may be estimated on the basis of a temperature and a use history, such as a charge history and a discharge history.

Figure 8:
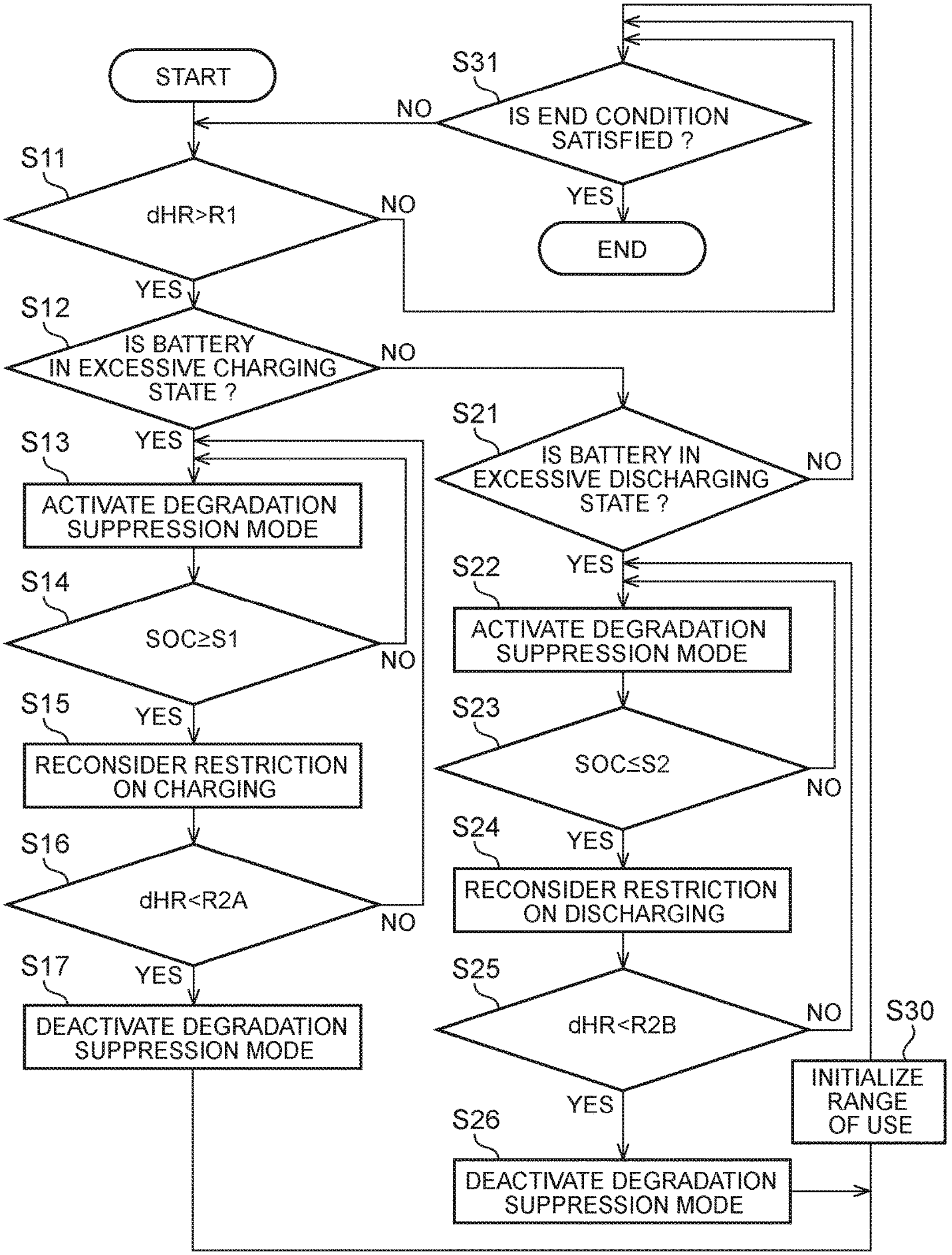
FIG. 8 is a flowchart that shows the control process of a controller.

FIG. 8 is a flowchart that shows the control process of the controller 100. As shown in FIG. 8, the controller 100 initially determines whether the high-rate degradation amount dHR is larger than the predetermined first reference value R1 (activation degradation amount) (S11). When the high-rate degradation amount dHR is larger than the predetermined first reference value R1 (activation degradation amount) (Y), it is determined whether the lithium ion secondary battery 10 is in the excessive charging state (S12). When the lithium ion secondary battery 10 is in the excessive charging state (Y), the first processing unit 121 is caused to execute the process (S13). Through the process executed by the first processing unit 121, a charge current is restricted (a restriction on charging is imposed), and a mode in which the lower limit SOC is raised (degradation suppression mode) is executed. Subsequently, it is determined whether the SOC of the lithium ion secondary battery 10 is higher than or equal to the predetermined first reference S1 (SOC≥S1) (S14). When the SOC of the lithium ion secondary battery 10 is higher than or equal to the predetermined first reference S1 (Y), the process of restricting the charge current in the process executed by the first processing unit 121 (S13) is reconsidered and is stopped or relaxed (S15). The degradation suppression mode in the process that is executed by the first processing unit 121 (S13) is continued.

The controller 100 determines whether the high-rate degradation amount dHR is smaller than the predetermined second reference value R2A (the stop degradation amount for the first processing unit 121) (S16). When the high-rate degradation amount dHR is smaller than the predetermined second reference value R2A (Y), the degradation suppression mode is stopped, and the first processing unit 121 is caused to stop the process (S17).

When the lithium ion secondary battery 10 is not in the excessive charging state (N) in determination as to whether the lithium ion secondary battery 10 is in the excessive charging state (S12), it is determined whether the lithium ion secondary battery 10 is in the excessive discharging state (S21). When the lithium ion secondary battery 10 is in the excessive discharging state (Y), the second processing unit 122 is caused to execute the process (S22). Through the process executed by the second processing unit 122, a discharge current is restricted, and a mode in which the upper limit SOC is lowered (degradation suppression mode) is executed. Subsequently, it is determined whether the SOC of the lithium ion secondary battery 10 is lower than or equal to the predetermined second reference S2 (SOC≤S2) (S23). When the SOC of the lithium ion secondary battery 10 is lower than or equal to the predetermined second reference S2 (Y), the process of restricting the discharge current in the process executed by the second processing unit 122 (S22) is reconsidered and is stopped or relaxed (S24). The degradation suppression mode in the process that is executed by the second processing unit 122 (S22) is continued.

The controller 100 determines whether the high-rate degradation amount dHR is smaller than the predetermined second reference value R2B (the stop degradation amount for the second processing unit 122) (S25). When the high-rate degradation amount dHR is smaller than the predetermined second reference value R2B (Y), the degradation suppression mode is stopped, and the second processing unit 122 is caused to stop the process (S26).

Thus, a series of control for reducing the high-rate degradation amount dHR completes. After that, the range of use of the lithium ion secondary battery 10, set by the range-of-use setting unit 131, is initialized (S30). Again, it is repeatedly determined whether the high-rate degradation amount dHR is larger than the predetermined first reference value R1 (activation degradation amount) (S11) until the high-rate degradation amount dHR becomes larger than the predetermined first reference value R1 (activation degradation amount). Control of the controller 100 that is suggested in this specification should be set so as to constantly work when the lithium ion secondary battery 10 that is the controlled object is charged or discharged. For example, in an application to a vehicle, such as an electric vehicle and a hybrid vehicle, control of the controller 100 that is suggested in this specification should be started in response to the start of control of a drive system including a lithium ion secondary battery mounted on the vehicle. Such an end condition that control of the controller 100 is ended should be set (S31), and, when the end condition is satisfied, control of the controller 100 that is suggested in this specification should be ended. For example, the case where control of the drive system including the lithium ion secondary battery is ended should be set for the end condition.

The control process of the controller 100 that is suggested in this specification is described above. The control process is only one example, and the controller that is suggested in this specification is not limited unless otherwise specified.

Figure 9:
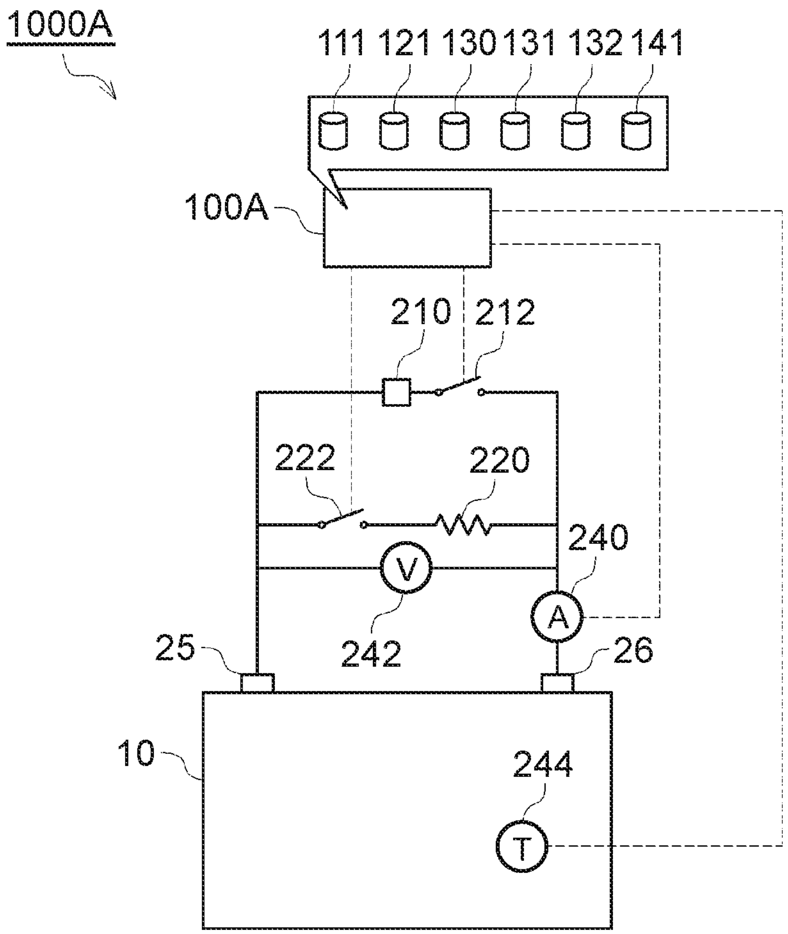
FIG. 9 is a block diagram of a control system.
Figure 10:
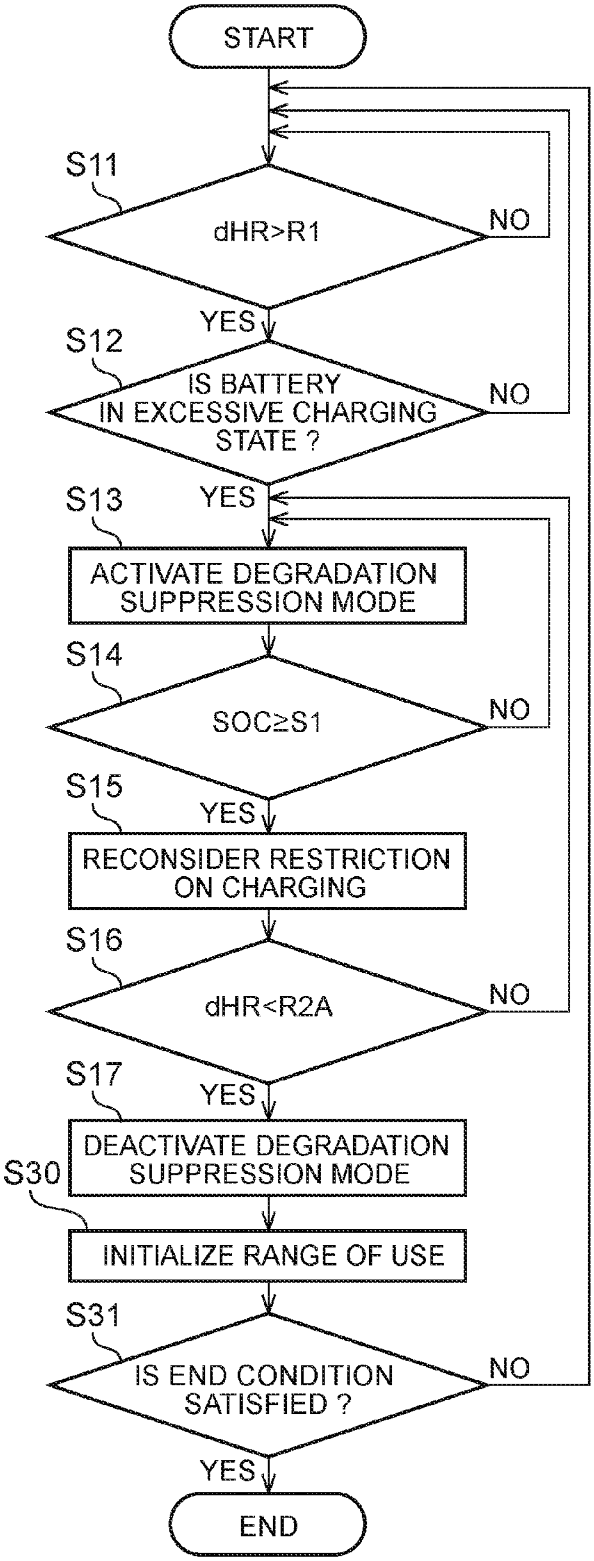
FIG. 10 is a flowchart of a controller.

For example, FIG. 9 is a block diagram of a control system 1000A according to another embodiment. In the mode shown in FIG. 9, as compared to the mode shown in FIG. 6, a controller 100A does not include the second processing unit 122 or the charge restricting unit 142. The controller 100A is configured as a device that prevents or reduces the degradation of the lithium ion secondary battery 10 when the lithium ion secondary battery 10 is in the excessive charging state. FIG. 10 is a flowchart of the controller 100A. The control process of the controller 100A includes the above-described control steps S11 to S17 as shown in FIG. 10. With the controller 100A, when the control steps S11 to S17 are executed, it is possible to early recover the lithium ion secondary battery 10 from the excessive charging state.

Figure 11:
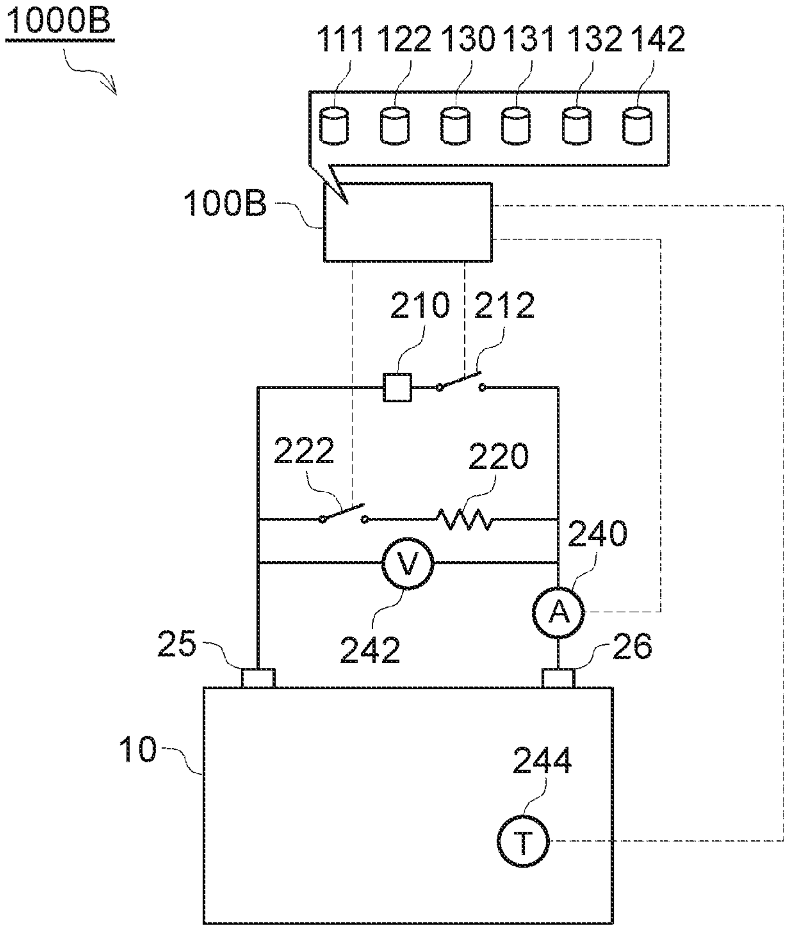
FIG. 11 is a block diagram of a control system.
Figure 12:
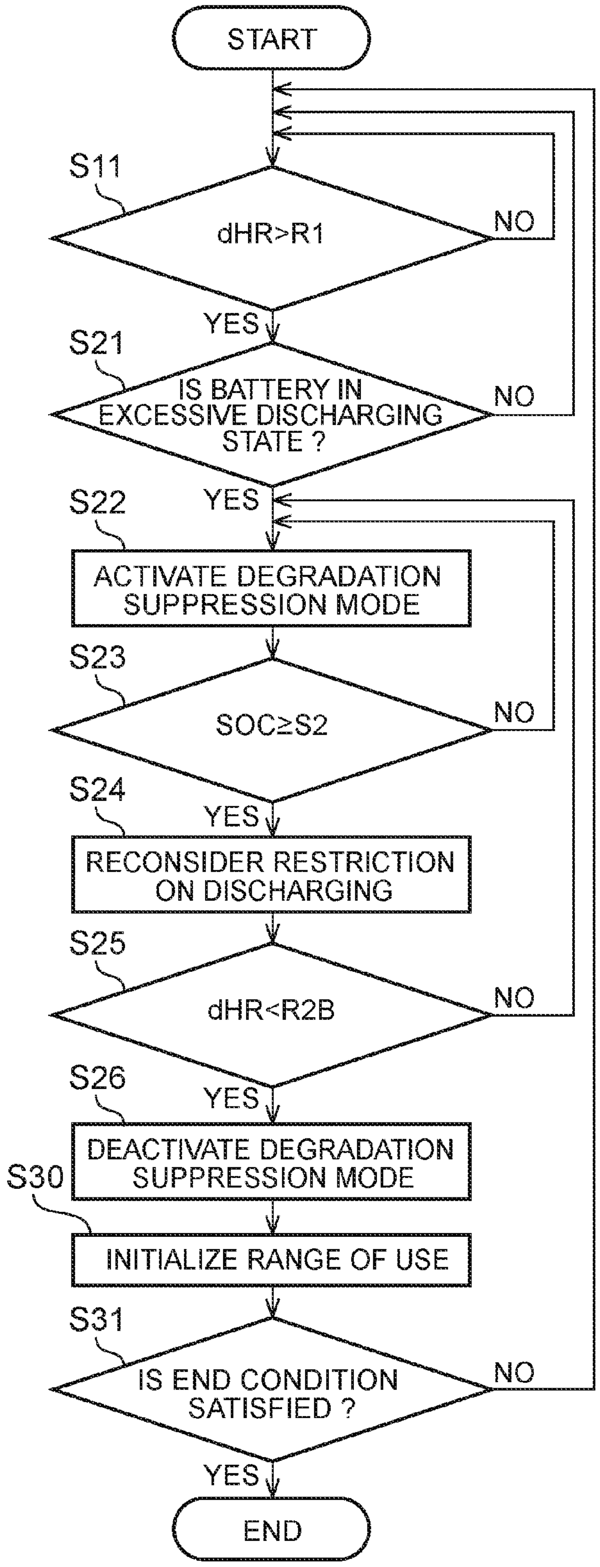
FIG. 12 is a flowchart of a controller.

FIG. 11 is a block diagram of a control system 1000B according to further another embodiment. In the mode shown in FIG. 11, as compared to the mode shown in FIG. 6, a controller 100B does not include the first processing unit 121 or the discharge restricting unit 141. The controller 100B is configured as a device that prevents or reduces the degradation of the lithium ion secondary battery 10 when the lithium ion secondary battery 10 is in the excessive discharging state. FIG. 12 is a flowchart of the controller 100B. The control process of the controller 100B includes the above-described control steps S21 to S26. With the controller 100B, when the control steps S21 to S26 are executed, it is possible to early recover the lithium ion secondary battery 10 from the excessive discharging state.

The lithium ion secondary battery 10 that is the controlled object is a single cell. Instead, the lithium ion secondary battery 10 that is the controlled object may be a battery pack in which the lithium ion secondary battery 10 is a battery component and a plurality of the battery components are connected. In this case, the controller may collectively control the battery pack or may control each of the lithium ion secondary batteries 10 that serve as the individual battery components of the battery pack.

Figure 13:
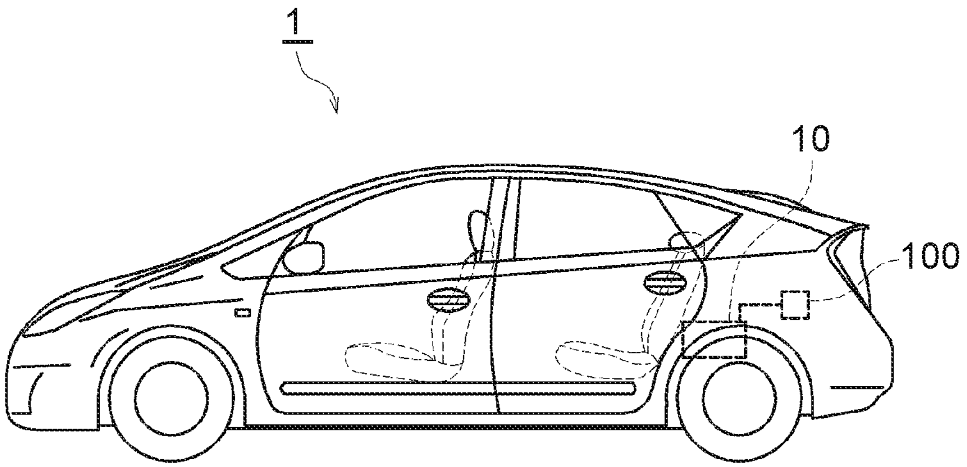
FIG. 13 is a side view that shows an example of the configuration of a vehicle.

FIG. 13 is a side view that shows an example of the configuration of the vehicle 1 including the lithium ion secondary battery 10 that is the controlled object and the controller 100 that is suggested in this specification. The controller 100 and control method that are suggested in this specification are allowed to employ a battery pack in which a plurality of battery components are connected as the lithium ion secondary battery 10 that is the object to be controlled by the controller 100 and the control method, as shown in FIG. 13. Examples of a vehicle including the battery pack may include various transport devices including the lithium ion secondary battery that is the controlled object, such as a hybrid vehicle, a plug-in hybrid vehicle and a hybrid railroad vehicle. The controller 100 includes a processing device and a storage device. The processing device executes arithmetic processing in accordance with predetermined programs. The storage device stores electronic information. The processing device may be referred to as central processing unit (CPU), or the like. The storage device may be referred to as memory, hard disk, or the like. The controller 100 executes predetermined arithmetic processing in accordance with predetermined programs, and electrically controls the lithium ion secondary battery 10 on the basis of the computed results. In an application to a vehicle, the controller 100 may be incorporated in an electronic control unit (ECU) mounted on a vehicle in order to control an engine, a steering, a brake, a secondary battery, and the like.

In control over the lithium ion secondary battery 10 actually mounted on a hybrid vehicle, the control was incorporated. A driving pattern having charging or discharging at a predetermined high rate was simulated. In this case, when the lithium ion secondary battery 10 is controlled such that an ordinary range of use is from SOC 40% to SOC 70%, if the lithium ion secondary battery 10 falls in the excessive charging state, the SOC of the lithium ion secondary battery 10 tends to remain in a low SOC range, so a restriction on the input occurs or the output decreases. When the lithium ion secondary battery 10 falls in the excessive discharging state, the SOC of the lithium ion secondary battery 10 tends to remain in a high SOC range, so a restriction on the output occurs or the output decreases. For this reason, use of the engine increased, with the result that the fuel efficiency was reduced by one-half. In contrast, with the control that is suggested in this specification, when the lithium ion secondary battery 10 is in the excessive charging state, the range of use was shifted toward a high SOC side, that is, an SOC of 55% to 70%. In addition, when the lithium ion secondary battery 10 is in the excessive discharging state, the range of use was shifted toward a low SOC side, that is, an SOC of 30% to 60%. Thus, it was possible to keep high power performance and high fuel consumption performance, and it was also possible to lessen the degradation of the performance of the lithium ion secondary battery.

What is claimed is:

1. A controller for a lithium ion secondary battery, the controller comprising an electronic control unit configured to:

detect a state of charge (SOC) of a lithium ion secondary battery that is a controlled object;

set an upper limit SOC and lower limit SOC of a range of use of the lithium ion secondary battery based on the SOC of the lithium ion secondary battery;

record a charge history and discharge history of the lithium ion secondary battery;

determine whether the lithium ion secondary battery is in an excessive charging state or an excessive discharging state based on the charge history and the discharge history; and raise the lower limit SOC when the lithium ion secondary battery is in the excessive charging state, wherein the excessive charging state indicates a state in which charge of the lithium ion secondary battery occurs faster than discharge of the lithium ion secondary battery.

2. The controller according to claim 1, wherein the electronic control unit is configured to restrict a discharge current such that the discharge current is smaller than a predetermined current value when a first processing unit of the controller determines that the lithium ion secondary battery is in the excessive charging state based on the charge history and the discharge history.

3. The controller according to claim 2, wherein the electronic control unit is further configured to stop or relax to restrict the discharge current when the SOC of the lithium ion secondary battery becomes higher than a predetermined SOC.

4. The controller according to claim 1, wherein the electronic control unit is further configured to charge the lithium ion secondary battery at a current value smaller than a predetermined current value, when the first processing unit determines that the lithium ion secondary battery is in the excessive charging state based on the charge history and the discharge history, and when the SOC of the lithium ion secondary battery is lower than a predetermined SOC.

5. The controller according to claim 1, wherein the electronic control unit is further configured to lower the upper limit SOC such that the upper limit SOC is higher than the lower limit SOC that has been raised by a first processing unit of the controller.

6. The controller according to claim 1, wherein the electronic control unit is configured to:

set a center range of the range of use of the lithium ion secondary battery based on the detected SOC, and raise the center range.

7. A controller for a lithium ion secondary battery, the controller comprising an electronic control unit configured to:

detect a state of charge (SOC) of a lithium ion secondary battery that is a controlled object;

set an upper limit SOC and lower limit SOC of a range of use of the lithium ion secondary battery based on the SOC of the lithium ion secondary battery;

record a charge history and discharge history of the lithium ion secondary battery;

determine whether the lithium ion secondary battery is in an excessive charging state or an excessive discharging state based on the charge history and the discharge history; and lower the upper limit SOC when the lithium ion secondary battery is in the excessive discharging state, wherein the excessive discharging states indicates a state in which discharge of the lithium ion secondary battery occurs faster than charge of the lithium ion secondary battery.

8. The controller according to claim 7, wherein the electronic control unit is further configured to restrict charge current such that the charge current is smaller than a predetermined current value, when the lithium ion secondary battery is in the excessive discharging state based on the charge history and the discharge history.

9. The controller according to claim 8, wherein the electronic control unit is further configured to stop or relax to restrict the charge current when the SOC of the lithium ion secondary battery becomes lower than a predetermined SOC.

10. The controller according to claim 7, wherein the electronic control unit is further configured to discharge the lithium ion secondary battery at a current value smaller than a predetermined current value, when the second processing unit determines that the lithium ion secondary battery is in the excessive discharging state based on the charge history and the discharge history, and when the SOC of the lithium ion secondary battery is higher than a predetermined SOC.

11. The controller according to claim 7, wherein the electronic control unit is further configured to raise the lower limit SOC such that the lower limit SOC is lower than the upper limit SOC that has been lowered by a second processing unit of the controller.

12. The controller according to claim 7, wherein the electronic control unit is further configured to:

set a center range of the range of use of the lithium ion secondary battery based on the detected SOC, and lower the center range.

13. The controller according to claim 1, wherein the electronic control unit is further configured to:

detect a high-rate degradation amount of the lithium ion secondary battery; and raise the lower limit SOC when the high-rate degradation amount is higher than a predetermined first reference value.

14. The controller according to claim 13, wherein the electronic control unit further is configured to stop raising the lower limit SOC when the high-rate degradation amount is lower than a predetermined second reference value.

15. The controller according to claim 7, wherein the electronic control unit is further configured to:

detect a high-rate degradation amount of the lithium ion secondary battery; and lower the upper limit SOC, when the high-rate degradation amount is higher than a predetermined first reference value.

16. The controller according to claim 15, wherein the electronic control unit is further configured to stop lowering the upper limit SOC, when the high-rate degradation amount is lower than a predetermined second reference value.

17. A vehicle comprising:
the controller according to claim 1; and
the lithium ion secondary battery.

18. A vehicle comprising:
the controller according to claim 7; and
the lithium ion secondary battery.

* * * * *